Dec. 2, 1952      G. E. FORD      2,620,412
ALARM GAUGE

Filed Jan. 16, 1948      5 Sheets-Sheet 1

GEORGE E. FORD
INVENTOR

BY Charles Shepard
ATTORNEY

Dec. 2, 1952  G. E. FORD  2,620,412
ALARM GAUGE

Filed Jan. 16, 1948  5 Sheets-Sheet 2

GEORGE E. FORD
INVENTOR

BY Charles Shepard
ATTORNEY

Dec. 2, 1952 G. E. FORD 2,620,412
ALARM GAUGE
Filed Jan. 16, 1948 5 Sheets-Sheet 3

GEORGE E. FORD
INVENTOR

BY Charles Shepard
ATTORNEY

Dec. 2, 1952    G. E. FORD    2,620,412
ALARM GAUGE
Filed Jan. 16, 1948    5 Sheets-Sheet 5
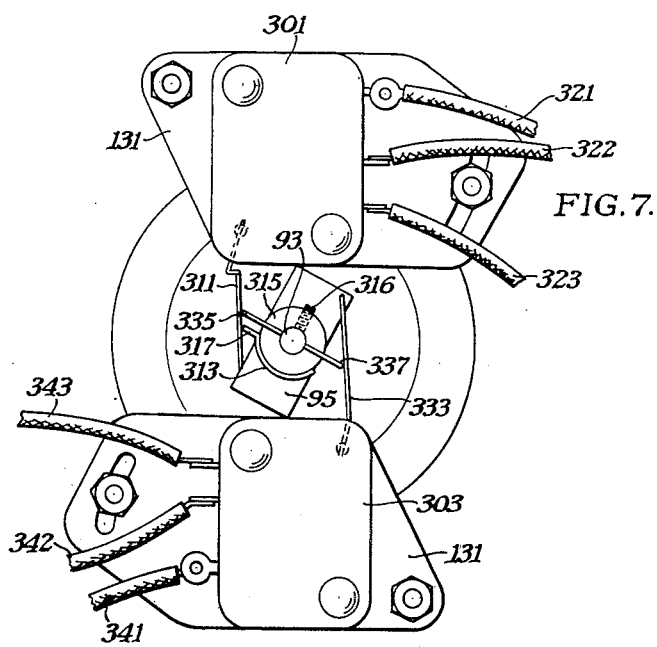
FIG. 7.
FIG. 8.
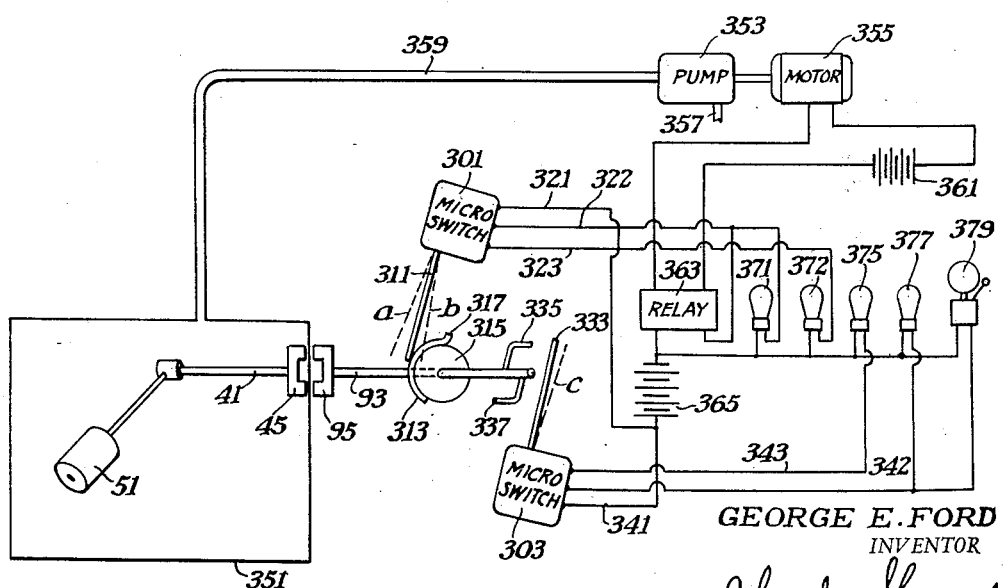
GEORGE E. FORD
INVENTOR
BY Charles Shepard
ATTORNEY Patented Dec. 2, 1952

2,620,412

UNITED STATES PATENT OFFICE 2,620,412

ALARM GAUGE

George E. Ford, Brighton, N. Y., assignor to Qualitrol Corporation, East Rochester, N. Y., a corporation of New York Application January 16, 1948, Serial No. 2,576

16 Claims. (Cl. 200—56)

This invention relates to an indicating instrument and more particularly to an alarm gauge of the liquid level type, adapted to give an audible or visible signal, or both, at a remote point, or to start or stop a pump, motor or other mechanism, with or without giving a signal, under certain conditions. An object of the invention is the provision of a generally improved and more satisfactory construction for such a gauge.

Another object is the provision of a gauge so designed and constructed that the electric switch mechanism controlling the remote audible or visible signal circuit or the motor circuit, or both, is all contained within the unitary gauge housing or casing, without requiring separate or supplementary casings or extensions on the casing for containing such switch mechanism.

Still another object is the provision of improved operating mechanism for operating and controlling the electric switch mechanism.

A further object is the provision of a gauge so designed and constructed that pulling the electric circuit wires partly out of the gauge casing for the purpose of making electrical connections, or shoving the wires partially back into the casing, will not damage any parts of the gauge.

A still further object is the provision of improved bearing means for the pointer or hand of the gauge, this improved bearing means being applicable to other gauges in addition to alarm gauges or motor-controlling gauges.

Still another object is the provision of an improved and more satisfactory casing construction for gauges of various types, including but not limited to alarm gauges.

Yet another object is the provision of improved means for sealing the gauge casing against entrance of dirt, moisture, or other foreign matter.

A further object is the provision of an electric circuit controlling gauge so designed and constructed that it may be quickly substituted for a liquid level gauge of the type having no electric circuit controlling features, without opening up or draining the liquid from the container to which the gauge is attached.

A still further object is the provision of an improved system for controlling the delivery of liquid into a tank or container.

These and other desirable objects are accomplished by the construction disclosed as an illustrative embodiment of the invention in the following description and in the accompanying drawings forming a part hereof, in which:

Fig. 7 is a fragmentary front view of part of the mechanism shown in Fig. 6, and Fig. 8 is a diagrammatic view of a liquid controlling system which includes the gauge shown in Figs. 6 and 7.

The same reference numerals throughout the several views indicate the same parts.

The construction herein disclosed may be considered as being in some respects an improvement upon the construction disclosed in the copending United States patent applications of George E. Ford, Serial No. 632,683, filed December 4, 1945, for Indicating Instruments (now Patent 2,473,581, granted June 21, 1949), and Serial No. 730,646, filed February 24, 1947, for Magnetic Drive Construction, now Patent No. 2,514,323, July 4, 1950. The present application is a continuation in part of both of said copending applications.

Figure 1:
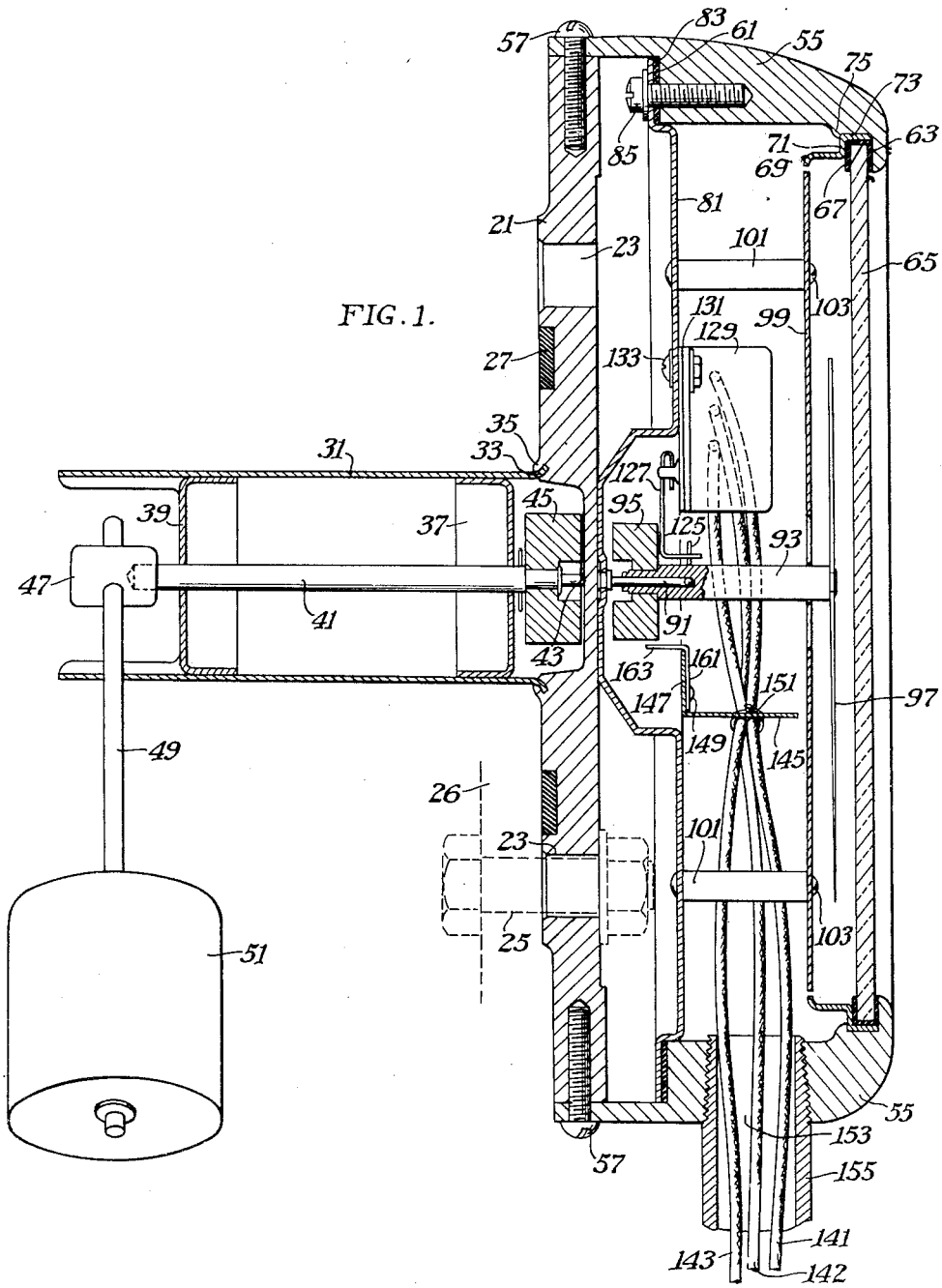
Fig. 1 is a cross section on an enlarged scale, taken substantially centrally through an alarm gauge in accordance with one embodiment of the invention.
Figure 2:
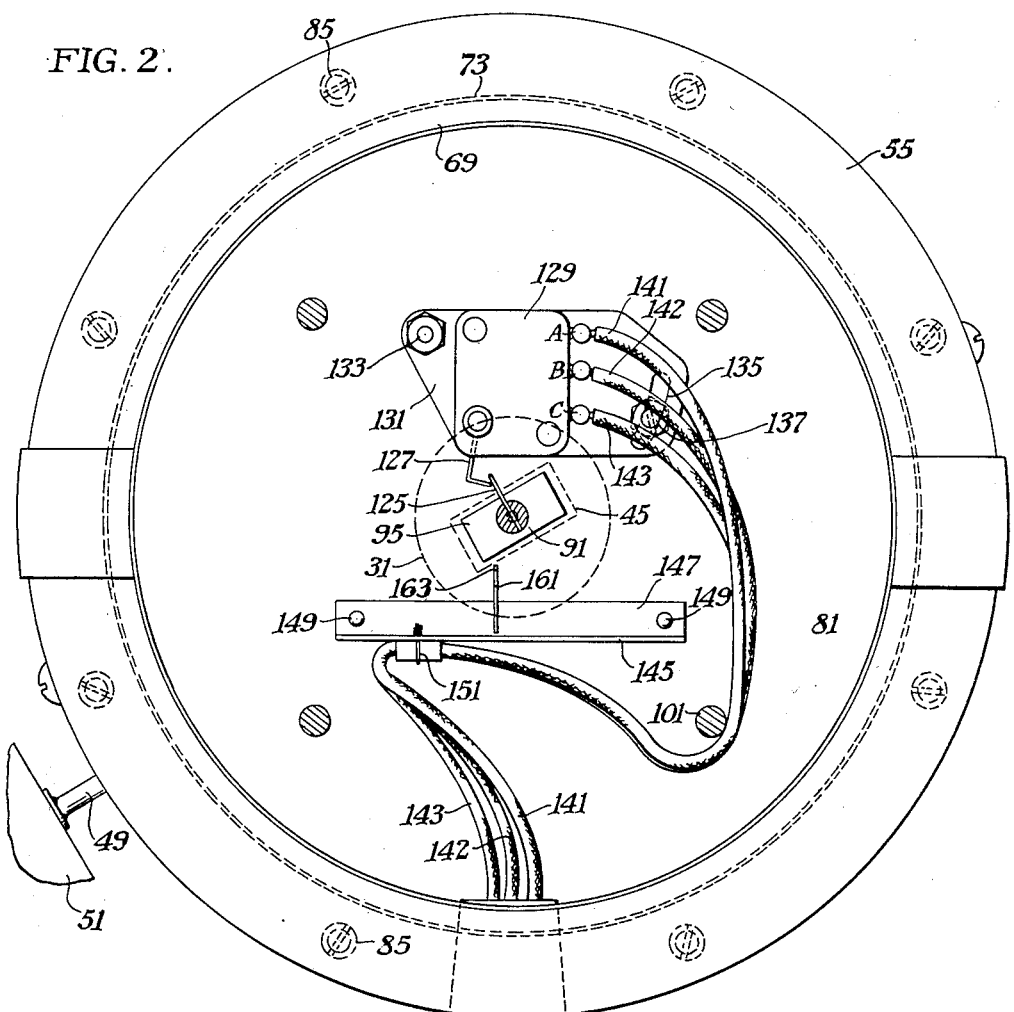
Fig. 2 is a front view of the gauge shown in Fig. 1, with the dial plate, the pointer, and various other parts omitted in order to show more clearly the construction beneath.

Referring first to the construction shown in Figs. 1 and 2, there is here shown an alarm gauge of the liquid level type, that is, a liquid level gauge having mechanism for controlling electric circuits which may be used to give a remote alarm or signal. The gauge comprises a main mounting plate 21 having holes 23 through which securing bolts or studs 25 may extend to secure the plate tightly against the front face of a suitable part of the tank or container 26 on which the gauge is mounted, an annular gasket 27 being set in an annular recess on the rear face of the plate 21, to make contact with the tank or container 26 and produce a liquid-tight seal between the two elements. Mounted on the rear face of the plate 21 is a tube 31 projecting rearwardly through a suitable opening in the tank or container 26, into the interior thereof. The forward end of the tube 31 is flared as at 33 and the portion of the mounting plate 21 around the flared end of the tube is staked or swaged down over the flared end of the tube as at 35 to form a permanent connection. A pair of pressed metal cup-shaped members 37 and 39 are pressed into the tube 31 and are centrally apertured to form bearings for a shaft 41 which has a pointed forward end 43 forming a thrust bearing abutting against the rear face of the plate 21. Fixed to the forward end of the shaft 41 is a permanent magnet 45, while the rear end of the shaft 41, a little to the rear of the rearmost bearing plate 39, carries a hub 47 fixed to the shaft and secured to a radial float arm 49 carrying a float member 51. The ends of the tube 31 extend rearwardly to a point slightly behind the hub 47, to protect the hub from contact with external articles, and the sides of the tube 31 are cut away opposite the radial arm 49, far enough to allow the radial arm its desired range of movement.

These parts are similar to the corresponding parts disclosed in said copending application Serial No. 730,646, and operate in substantially the same way. As in said copending application, the tube 31 in conjunction with the transverse bearing member 39 serves to keep any metal chips which may be circulating around in the liquid in which this gauge is immersed from being attracted by the magnet 45 into a position where they could interfere with movement of the apparatus.

The mounting plate 21 is of any desired peripheral configuration, usually square or circular, the latter being preferred in most instances. Embracing the periphery of this plate 21 is a bezel member 55 held to the plate 21 by a series of radial screws 57. Near its rear edge but a little in front of the plate 21, the bezel 55 has a rearwardly faced internal shoulder 61 against which the case of the gauge may be mounted, and near its front edge the bezel 55 has a rearwardly faced internal shoulder 63 against which the gauge glass or transparent plate 65 may be mounted, the edge of the glass 65 being embraced by a gasket 67 of U-shaped cross section. The glass 65 and gasket 67 are held in place by a metal ring 69 having an annular shoulder 71 pressing forwardly against the rear face of the gasket 67, and a cylindrical part 73 which is a tight press fit in the bezel 55 (being pressed in from the rear) and which is held in place by the tight nature of such press fit supplemented, if desired, by staked portions 75 on the bezel 55 being staked down against the rear face of the flange 71 of the metal ring 69, either continuously all the way around the ring 69, or preferably at various spaced points around the ring.

The gauge case 81 is a metal plate, preferably extending continuously across the entire area of the bezel 55 and having its marginal edges seated against the rear face of a gasket 83 which in turn is seated on the rearwardly faced shoulder 61 of the bezel and held thereto by a series of screws 85. Since the front of the bezel is completely closed and sealed by the glass 65 and its associated gasket, and since the case 81 is sealed to the bezel with a gasket, it follows that the space between the glass 65 and the case 81 (which is the space containing the principal operating parts of the gauge) is completely sealed against access of external moisture, dust, etc., except for the opening through which the electric circuit wires extend, and this opening can either be left open or sealed, as desired, as will be later explained.

The case 81 is preferably dished rearwardly at its central portion, as shown, so that although the outer portions of the case are spaced forwardly from the mounting plate 21 (to obtain ample clearance for the heads of the screws 85) the central portion of the case lies substantially in contact with the front face of the mounting plate 21, as well shown in Fig. 1. At the center of the case 81, a stud or pin 91 is securely riveted to the case 81 and projects forwardly therefrom, the pin preferably also being brazed or soldered to the case if extra precautions are desired, in addition to the riveting operation, to obtain a perfectly tight seal of the interior of the gauge. This stud or pin 91 forms a bearing on which is rotatably mounted a post 93, the rear end of which has fixed thereto a permanent magnet 95, and the forward end of which has fixed thereto, as by riveting, a pointer or hand 97.

As is well understood in the art, the driven magnet 95 has its poles reversed with respect to the driving magnet 45, and the magnet 95 follows accurately the rotary movements of the magnet 45 produced by the rise and fall of the float 51, the rotary movements being thus transmitted to the hand or pointer 97 which sweeps over suitable graduations on a dial plate 99 supported by a series of posts 101 which are riveted at their rear ends to the case 81 in a tight manner so as not to interfere with the sealing function of the case. The dial plate 99 may be held removably to the posts 101 as by screws 103. It is noted that the edges of the dial plate terminate slightly inside the metal ring 69 so that a slight crack or space is left between the periphery of the dial plate and the metal ring. Although it is intended that the dial plate shall lie substantially in the plane of the inturned rear edge of the metal ring 69, for the sake of smooth appearance, yet the dial plate is actually mounted independently of the ring 69, so that manufacturing variations in the lengths of the supporting posts 101 or in the exact fore-and-aft location of the case 81 will have no effect on the tightness of sealing of the glass 65 at the front of the gauge.

Figure 3:
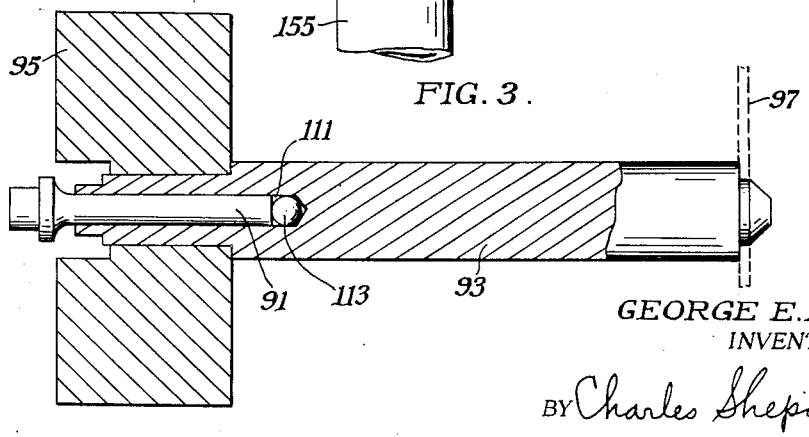
Fig. 3 is an enlarged section taken centrally through the improved pointer bearing of the present invention.

An improved bearing is provided for the post 93 on the stud 91. Referring to Fig. 3, the front end of the stud 91 is made flat instead of the usual conical shape heretofore employed. The post 93 is provided with a bore 111 having an initial diameter substantially equal to the diameter of the stud 91. Then into this bore 111 is tightly pressed or forced a metal ball or sphere 113 having a diameter very slightly greater than that of the bore 111 and pin 91, the diameter being, for example, .001 or .0005 of an inch larger than the diameter of the pin 91 and bore 111. As this ball 113 forces its way into the bore 111, it burnishes the inner surface of the bore 111 and produces a very highly polished or finished inner surface. This forms an excellent low-friction and accurate lateral bearing for the post 93 on the pin 91, while the ball 113, contacting with the flat or squared end of the pin 91, forms an excellent and accurate thrust bearing to resist the rearward thrust of the post 93 on the pin 91, caused by the attraction between the magnet 95 and the magnet 45.

It is seen that this improved bearing is relatively inexpensive and easy to make, yet gives very improved results as compared with prior bearings of this character. It is an easy and inexpensive matter to burnish or polish the exterior surface of the pin 91 to any degree desired, and it is easy and inexpensive to square off the end of this pin, as compared with the greater expense of accurately forming a tapered or conical end on the pin as has been done in prior practice. Moreover, the squared end of the pin is much less liable to be damaged in handling than the conical or pointed end heretofore used. The internal burnishing or polishing of a small bore such as the bore 111 has heretofore involved difficulties and considerable expense, but in the present improved construction it is very easy and inexpensive, as the mere fact of forcing the ball 113 into the bore 111 smooths and burnishes the surface of the bore automatically as the ball moves along it, and the ball itself, cooperating with the squared end of the pin 91, forms a very excellent end thrust bearing.

The post 93 is provided in an appropriate location with a radially extending pin 125 tightly pressed into a radial bore in the post 93, which pin 125 contacts with and moves an operating arm 127 on a microswitch 129 (sometimes called a snap switch) mounted in fixed position on a plate 131 which has one end pivotally secured to the case 81 by means of a bolt 133 passing through the case and soldered or brazed therein to avoid any leakage through the case at this point, the other end of the plate 131 being provided with an arcuate slot 135 concentric with the pivot 133, and a bolt 137 is similarly soldered in the case 81 and passes through the slot 135. The microswitch or snap switch 129 is a type of switch which is well known and is commonly available on the market. As well understood by those familiar with such switches, the operating arm 127 may be swung or oscillated through a considerable range of movement. As the arm 127 swings in one direction, it closes certain switch contacts within the body of the switch 129 when the arm reaches a given position, but the arm may continue to swing to a considerable extent beyond the switch-closing position, without any appreciable increase in the very slight resistance which the arm offers to such swinging movement. As the arm 127 swings in the opposite direction, it opens the same switch contacts when the arm reaches another position close to but slightly spaced from the position at which the contacts are closed. Within the limited range between these two positions (a range usually of about 5° to 10° of arc) the switch arm may swing back and forth in either direction without operating the switch; that is, without opening it if it is closed, and without closing it if it is open. If the switch is of the three-wire type (also well known in the art) rather than the two-wire type, a second pair of electric contacts are opened simultaneously with the closing of the first pair of contacts when the switch arm reaches said given position while swinging in the first direction, and the second pair of contacts are closed simultaneouly with the opening of the first pair of contacts when the arm reaches said other position while swinging in the opposite direction. The ability of the switch operating arm 127 to continue moving in the same direction, beyond the switch-operating position, without interposing any increased or substantial resistance to the member or element which is causing the swinging movement, is a particularly valuable feature in a gauge of the present type, both because the magnetic drive between the magnets 45 and 95 is capable of transmitting only a relatively slight torque, and also because it is desired that the operation of the electric switch shall not interfere with continued movement of the pointer or hand 97 beyond the point where the switch opens or closes if the variable factor (in this case, the variation in level of the liquid acting on the float 51) continues to vary in the same direction after reaching the point where the switch is opened or closed. Because of the very slight force required to oscillate the switch operating arm 127 in this construction, the magnetic drive 45, 95 is able to transmit sufficient power so that the pin 125, acting on the switch operating arm 127, easily moves the switch operating arm to the proper position to open or close the electric circuit, and continues to move it beyond this position if the float 51 continues to rise or fall as the case may be, so that the pointer 97 always shows correctly the actual elevation of the liquid acting on the float 51, without being stopped in its movement by the electric switch mechanism.

The switch pin 125 on the post 93 is placed in the post at such orientation to the magnet 95 and in such relation to the switch arm 127 that the switch is operated when the post 93 reaches approximately the desired rotary position indicating either a high level or a low level (usually the latter) of the liquid acting on the float 51. Then the fine adjustment or calibration of the exact point at which the switch is operated is obtained by loosening the nuts on the bolts 133 and 137, and swinging the entire microswitch 129 and its plate 131 slightly in one direction or the other about the bolt 133 as a pivot. When calibration is completed, both nuts on both bolts 133 and 137 are tightened, thus holding the microswitch in the desired fixed position. The pin 125 is made long enough, relative to the switch operating arm 127, so that the pin will still contact with the arm even if the plate 131 is swung to its maximum extent in a counterclockwise direction about the pivot 133.

Alarm gauges of this type are usually intended to give an alarm when the liquid reaches a low level rather than a high level, although the reverse condition or both conditions can be indicated, if desired. It is usually preferred to employ a microswitch 129 of the two circuit type, in which one circuit is normally closed and the other normally open, and in which operation of the arm 127 to the predetermined position serves to open the first circuit and close the second circuit. Such switches are well known. They are provided with three binding posts indicated at A, B, and C in Fig. 2, and three electric wires covered with suitable insulation run from these three binding posts as indicated at 141, 142, and 143, respectively. The wires are looped around one of the posts 101 which support the dial 99 from the case 81, and thence extend to a position beneath a guard plate which has a forwardly projecting horizontal flange 145, as shown, and a vertical rear flange 147 having its ends lying against the front of the case 81 and secured thereto by rivets 149. The wires are firmly tied to the lower face of the guard flange 145 as indicated at 151, and thence extend downwardly and out of the casing through an opening 153 provided with a standard female pipe thread so that a standard electric wiring conduit 155 may be screwed tightly into the opening 153, the wires extending out through the conduit to any desired point. It is seen that considerable space is provided inside the gauge, below the guard flange 145, in which the wires may be folded back and forth if it is desired to provide wires of considerable length.

The guard member 145, 147 performs a triple function. First, it acts as a support to which the electric wires are tightly tied at 151 so that when the ends of the wires projecting out through the opening 153 are pulled or jerked during the wiring operation when the gauge is being installed, the longitudinal force exerted on the wires will be absorbed by the tie 151 and will not be transmitted to the microswitch binding posts. Second, the flange 145 serves the important function of acting as a guard to prevent the wires from being accidentally shoved upwardly against the rotatable post 93, the microswitch arm 127, or other movable or breakable parts of the apparatus. In accordance with customary electrical wiring practice, the electrician installing the alarm gauge will usually make his connections to the outer ends of the wires 141, 142, and 143 with some degree of slack, and then when his connections are completed, the electrician is likely to shove the excess length of wires back up into the gauge body. Without a guard plate such as provided by the flange 145, it is very likely that the upward shoving of the excess length of the wires might easily cause them to contact with the movable parts of the gauge and interfere with proper operation thereof.

Third, the guard member 145, 147 also performs the function of providing a support for a stop member in the form of an angularly bent wire or rod having a vertical portion 161 soldered or otherwise fixedly secured to the vertical flange 147, and a horizontally extending portion 163 which lies in the path of the magnet 95 to serve as an abutment or stop limiting the rotation of the magnet in either direction, while allowing the desired range of rotation adequate to cover the entire scale of graduations on the dial plate. Thus the magnet 95 is free to turn through its entire useful range of travel, but cannot turn beyond its useful range, because of the stop 163, and is prevented from swinging completely around and possibly causing damage to the microswitch or getting the pin 125 on the wrong side of the microswitch arm 127, as might be the case during rough handling in transportation, if no stop were provided. It is to be noted that among the rotatable parts consisting of the post 93, the magnet 95, the pointer 97, and the pin 125, the part having the greatest mass is the magnet 95, and the stop 163 lies directly in the path of movement of this magnet 95 and acts directly on the magnet, so that the other lighter and more delicate parts are not strained as might be the case if the stop were to coact with some part other than the magnet.

The interior of the gauge between the case 81 and the glass 65 is completely sealed except for the opening 153 into which the conduit 155 is screwed. In some instances, there is no objection to leaving the gauge open at this point. In other instances, it may be sealed by making sure that the conduit 155 is tightly sealed at some suitable point, such as an electric junction box to which the conduit leads. In still other instances, it may be preferred to have the gauge completely sealed at all times, and this can be accomplished by the use, in the opening 153, of the electric plug sealing means shown in connection with the embodiment of Fig. 5 of the present drawings, which can be used in conjunction with this present embodiment of the gauge (Figs. 1-3) just as well as in the alternative embodiment indicated in Fig. 5.

Figure 4:
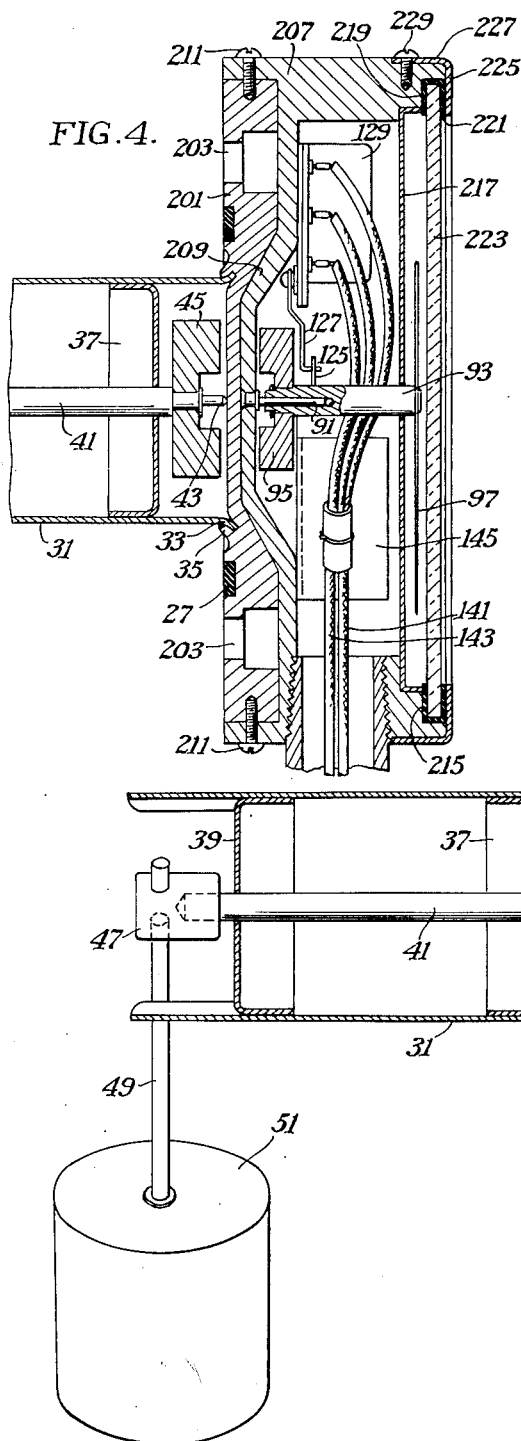
Fig. 4 is a fragmentary view similar to a portion of Fig. 1, showing an alternative construction.

Referring now to the modified construction shown in Fig. 4, there is here disclosed a somewhat similar construction having fewer parts than the construction previously described, and which is quite satisfactory for many uses, although not having all of the advantages of the construction disclosed in Figs. 1-3. The construction of Fig. 4 differs from the construction of Figs. 1-3 in the design of the bezel and case and the manner in which the interior of the gauge is sealed, but the working parts of the gauge may be constructed exactly as previously described and operate in the same way. Referring now to Fig. 4, the mounting plate 201 may be the same as the mounting plate 21 previously described, except that it is preferably somewhat dished on its front face at the center, as shown. It is held to the tank or container by bolts or studs extending through the openings 203, just as before, and the float and drive magnet parts are just the same as before, and are similarly numbered.

The bezel 207 and case 209 in the present instance are made of one piece of material, integrally formed by casting, forging, or other appropriate process. As before, the bezel 207 has the rearwardly extending flange which embraces the peripheral contour of the mounting plate 201 and is held thereto by radial screws 211. The case 209 forms an airtight wall extending across the rear portion of the bezel and lying in contact with or relatively close to the front face of the mounting plate 201.

Near the front edge of the bezel 207, it is provided with an internal shoulder 215 in which is seated the periphery of a cup-shaped dial plate 217. In front of this shoulder 215 is a second shoulder 219 of slightly larger diameter, in which is seated the U-shaped gasket 221 holding the gauge glass or transparent plate 223, the gasket and glass being retained in place by a supplementary bezel 225 having a front annular flange overlapping the front of the gasket 221 as shown, and a rearwardly extending cylindrical flange 227 held on the main bezel 207 by radially extending screws 229. The rear face of the gasket 221 presses not only against the shoulder 219 but also against the front edge of the marginal cylindrical flange of the dial plate 217, thus holding the latter in its seat 215.

All the other parts of the gauge are the same in construction and operation as the corresponding parts of the gauge shown in Figs. 1-3, and are here indicated by the same reference numerals.

In this gauge of Fig. 4, the interior parts of the gauge can be reached from the front, without taking the main bezel 207 off of the mounting plate 201. This is accomplished by taking out the screws 229 and removing the supplementary bezel 225, so that the glass 223 can be removed, whereupon the dial plate 217 can also be removed and the removal of the dial plate carries with it the pointer 97 and the post 93, which simply pulls axially off of its bearing stud 91. Access may then be had to the microswitch 129 for any necessary adjustments or repairs. Although this construction opening from the front is desirable at times, yet in general the construction of Figs. 1-3 is preferred, as there is less temptation for an inexperienced person or amateur mechanic to open up the gauge and attempt to meddle with the interior thereof.

Figure 5:
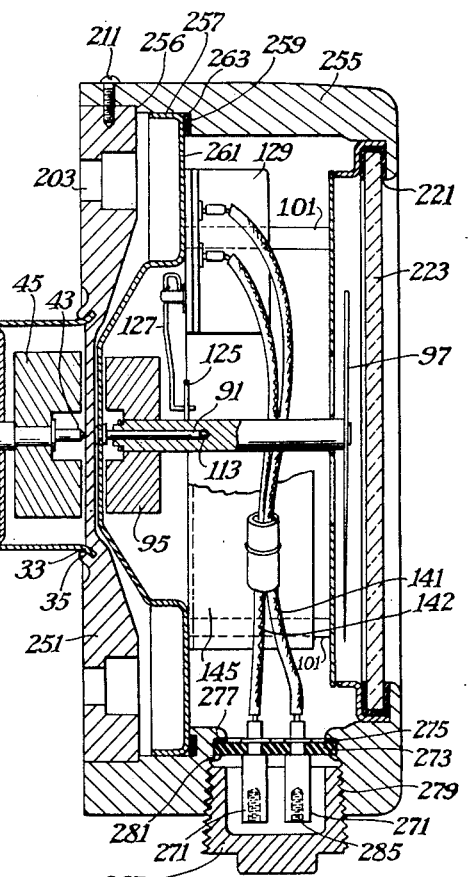
Fig. 5 is a fragmentary view also similar to a portion of Fig. 1, showing another alternative construction.

Another modified construction is shown in Fig. 5. As in the case of the construction of Fig. 4, the operating parts of the gauge are the same as in the first embodiment of Figs. 1-3, the principal difference being merely in the construction of the bezel and the manner in which the interior of the gauge is sealed.

In this modified construction of Fig. 5, the mounting plate is shown at 251, and corresponds substantially with the mounting plate 21 in the previous embodiment, any slight changes in shape being immaterial for present purposes. The bezel is indicated at 255 and has at its rear edge an annular cylindrical flange embracing the periphery of the mounting plate 251 and held thereto by radial screws just as in the previous embodiment of Figs. 1–3. Ahead of the part which embraces the periphery of the mounting plate is a narrow shoulder 256 leading to a cylindrical internal surface 257, the forward end of which is defined by the rearwardly faced shoulder 259. The case 261 is a tight press fit in the portion 257 of the bezel, and a gasket 263 is compressed between the front of the case 261 and the shoulder 259, providing permanent tight sealing at this point. The bezel may be staked over the rear edge of the case 261 if desired, the shoulder 256 providing a convenient ledge to be engaged by a staking tool, or the tight press fit of the case in the bezel may be relied upon for permanently holding the case in fixed position without staking.

All of the other features of the interior construction of the gauge, except the manner in which the case is mounted in the bezel, may be the same as the first embodiment shown in Figs. 1–3, and the parts are indicated by the same reference numerals as used before. It will be seen, then, that the difference between this construction of Fig. 5 and the construction of Figs. 1–3 is that in the present construction of Fig. 5, the interior of the gauge is permanently sealed by the tight press fit of the case in the bezel, and no access to the interior of the gauge can be obtained, after once it is assembled, without practically destroying the construction. In the other construction shown in Figs. 1–3, however, access to the interior can be obtained (after the bezel 55 is removed from the mounting plate 21) by removing the screws 85, which permits removing the case 81 from the bezel.

Another sealing feature is shown in Fig. 5 for convenience, though it may be applied equally well, as already indicated above, to the construction shown in Figs. 1–3 or to the alternative construction shown in Fig. 4. This sealing feature has to do with the sealing of the orifice through which the electrical wires emerge from the gauge. In any of these constructions, the wires may simply come out of a threaded opening into which an electrical conduit is screwed, as indicated in Fig. 1, or, in any of these constructions, a permanent seal may be used at this point. For example, referring again to Fig. 5, the electric circuit wires, instead of leading out of the case, are connected at their lower ends to individual metal posts 271, two of which are here shown, extending through and tightly mounted in the insulating plate 273, which is mounted, with the interposition of a gasket 275, against an annular shoulder 277 at the inner end of the conduit orifice provided with pipe threads 279. The metal of the bezel is staked over the outer edge of the insulating plate 273 as at 281, to hold it permanently in place. The metal posts 271 can be engaged by any suitable electrical plug of proper size to fit these posts or prongs, thus making a connection with external wiring, or if preferred, instead of using a plug sliding over the posts 271, external electrical wires may be held to the posts by the heads of screws screwed into tapped openings 285 extending inwardly from the lower ends of the posts 271.

During handling and transportation, the posts 271 are protected by a cap plug 287 which is screwed into the thread 279 of the conduit opening. This plug is a "throw away," that is, when the gauge arrives at its destination and is being installed, the plug 287 is removed and thrown away and a conduit is screwed into the threads 279 after making appropriate electrical connections with the posts 271. This manner of getting the electrical connections from the interior to the exterior of the gauge may be used wherever complete sealing of the interior of the gauge is desired. Alternatively, sealing of the wires may be accomplished by the somewhat similar construction disclosed in Fig. 8 of the drawings of my copending patent application on Alarm Thermometer, Serial No. 2,575, filed January 16, 1948.

In all of these constructions here disclosed, the electric alarm mechanism will be actuated to give an audible or visible indication at a remote point, whenever the level of the liquid affecting the float 51 reaches a predetermined high point or low point, as the case may be, depending on the function for which the gauge is designed. A single electric circuit of two wires may be used if desired, to give a signal only when the predetermined low point or high point of the liquid level is reached, but preferably, as already indicated, three wires are used to form two electric circuits, so that an attendant at the remote point can always be sure that the gauge is functioning. For example, if the gauge is constructed to give a warning indication of low level of the liquid, then a microswitch 129 is used of the type in which the switch normally makes contact between the binding posts A and B and when the switch is displaced far enough by a low level of the liquid, the contact between the binding posts A and B is broken and a new contact is established between the binding posts A and C, for example. With such arrangement, the wires 141 and 142 may lead, for example, to a green light which is normally lit, showing the liquid level is at a satisfactory elevation. The wires 141 and 143 may lead to a red light, and also to an alarm bell, if desired. When the green light goes out and the red light comes on, the attendant knows that the liquid level has fallen from a satisfactory elevation to an unsatisfactory elevation, and steps can immediately be taken for remedial action.

One of the noteworthy features of this gauge is its sturdiness, a very necessary feature if the gauge is to stand up under conditions often encountered in use. Gauges of this type are frequently employed to indicate the level of the insulating oil in an electric transformer casing. Service men climbing around the transformer casing in the course of normal servicing of the transformer, are likely to use any available protuberance as a step to help in the climbing operation, and it has frequently happened that a service man has stepped on and put his entire weight on a liquid level gauge protruding from the transformer casing. Thus gauges are frequently broken right off of the transformer casing unless they are of unusually sturdy construction. In the present instance, it is seen that the backing plate or mounting plate 21 is sturdily bolted directly to the transformer casing 26, and that the only exposed part of the gauge on which a service man could put his foot is the bezel 55 or 287 or 255, and in all three embodiments of the gauge this bezel is a sturdy member which encircles the periphery of the mounting plate 21 and thus is strongly supported directly by the mounting plate, any downward pressure or weight on the bezel being transmitted direct to the edge of the mounting plate 21 quite independently of the holding screws 57, 211, etc. Because of this sturdy construction, there is practically no danger of breaking the gauge off of the transformer casing even if subjected to rough usage such as being used as a step.

Another noteworthy feature of the present construction is that the alarm gauge is readily interchangeable with a similar liquid level gauge not having the alarm feature, which interchangeability affects only the bezel and parts contained therein, without requiring removal or replacement of the mounting plate 21 or the float mechanism and drive magnet which are supported from the mounting plate. This is quite important as a practical matter, because, in actual conditions of use, it is often not determined until the last minute whether an ordinary liquid level gauge (without alarm features) or an alarm gauge will be required for any particular installation. For example, when a given number of electrical transformers leave the transformer factory, it usually is not known just where they will be installed. Some of the transformers may ultimately be installed at substations or other buildings having an attendant nearby, so that an ordinary type of gauge having no remote alarm features will be sufficient. Other transformers in the same shipment from the factory may ultimately be installed at remote and inaccessible locations where it is desired to have a remote electric alarm indicating when the level of the transformer oil falls too low.

With the present construction, the transformer manufacturer can secure the mounting plate 21 on the transformer casing with assurance that no matter which type of gauge is needed, the mounting plate 21 will not have to be disturbed and thus the oil will not have to be drained out of the transformer, as would be the case if the mounting plate had to be taken off and replaced by another. If it is found at the time of actual installation of the transformer that this particular transformer is equipped with an alarm gauge where only an ordinary visual gauge is necessary, it is an easy matter to remove the screws 57, take the gauge off of the mounting plate 21, and replace it with a gauge of the simpler visual type, which fits in the same way over the same mounting plate 21, and is driven by the same drive magnet, as indicated for example in said copending patent application, Serial No. 730,646. Or vice versa, of course, if a mere visual gauge is initially provided on the transformer and it is found, upon installation, that an alarm gauge is necessary, the visual gauge can be removed and replaced by an alarm gauge, without the necessity of draining the oil from the transformer casing as has usually been necessary when most of the gauges of the prior art have been replaced.

Figure 6:
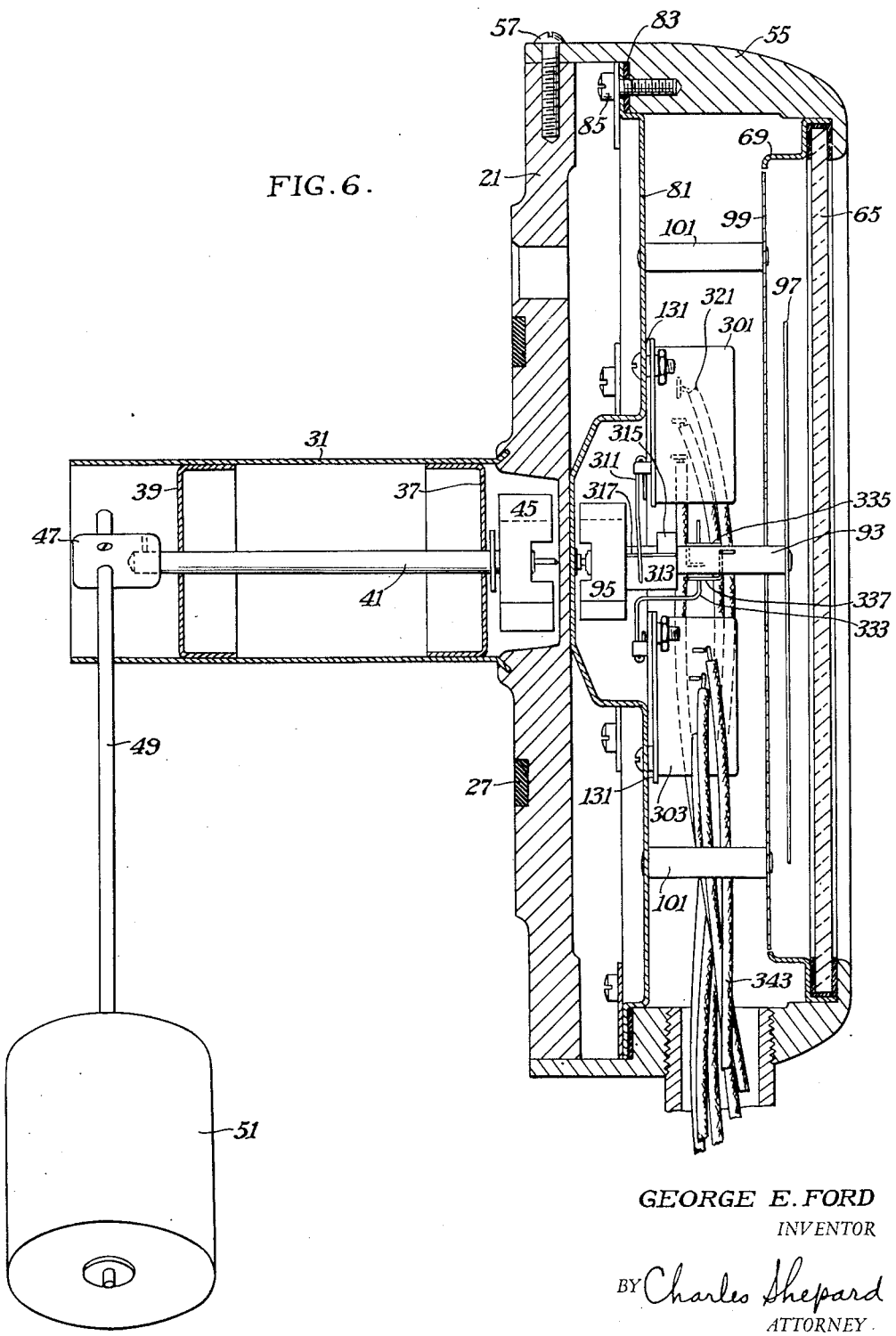
Fig. 6 is a view similar to Fig. 1, showing a different embodiment of the invention.

Another embodiment of the present invention, useful particularly in connection with the automatic control of mechanism (such as a pump, for example) which should be started or stopped depending upon variations in a liquid level condition, is illustrated in Figs. 6 and 7 of the present drawings. Referring to these figures, the construction of the control gauge in this embodiment may be the same, except for the electric switches and their operating parts, as any of the constructions described in connection with Figs. 1 to 5, but for convenience of illustration the control gauge is shown as being of the same general form as the alarm gauge of Figs. 1–3, and the parts in Figs. 6 and 7 (except for the switches and associated operating parts) are identified by the same numerals used for the corresponding parts in Figs. 1–3.

Instead of containing a single switch, this embodiment of Figs. 6 and 7 contains two microswitches or snap switches designated, respectively, by the numerals 301 and 303, each switch being mounted on a mounting plate 131 adjustable for close calibration in the same manner as previously described. Each of these switches 301 and 303 is of the two-circuit or three-wire type, as indicated in Fig. 7. The switch 301 and its mounting plate 131 are preferably mounted on the case 81 just above the pointer shaft 93, while the switch 303 and its mounting plate 131 are mounted on the case 81 just below the pointer shaft 93.

The upper switch 301 has a depending operating arm 311 which is normally lightly urged in a direction towards the pointer shaft 93, but which may be displaced away from this shaft by slight force. This operating arm 311 swings in a plane transverse to the axis of the shaft 93 and is adapted to cooperate with a cam member 313 in the form of an arcuate plate fixed to the periphery of a disk 315 mounted on the shaft 93 and normally fixed thereto to turn therewith, but capable of adjustment on the shaft for calibration purposes by loosening a setscrew 316 which holds the disk 315 in any given position on the shaft 93. The main part of the cam plate 313 is an arcuate surface concentric with the axis of the shaft 93, but the clockwise edge 317 of the cam plate 313, when viewed from the front (that is, the leading edge when the shaft turns in a clockwise direction or the trailing edge when the shaft turns in a counterclockwise direction) is slightly curled outwardly away from the shaft 93, as seen in Fig. 7, so that this clockwise edge 317 lies slightly farther away from the axis of the shaft 93, than does the main part of the outer surface of the cam plate 313.

As above mentioned, the microswitch 301 is of the two-circuit or three-wire type, having wires 321, 322, and 323 leading from it. One circuit is constituted by the wires 321 and 322, this circuit being open when the switch operating arm 311 lies close to the shaft 93, and being closed when the switch arm 311 is swung outwardly to a sufficient extent away from the shaft 93. The other circuit is constituted by the wires 321 and 323, and is closed when the operating arm 311 lies close to the shaft 93 and is opened, simultaneously with the closing of the first mentioned circuit, when the switch arm 311 is displaced sufficiently outwardly away from the shaft 93.

The second microswitch or snap switch 303 has an operating arm 333 which likewise swings in a plane transverse to the shaft 93, but the arm 333 is bent forwardly parallel to the shaft, and then transverse to the shaft, as seen in Fig. 6, so that the effective end of the arm 333 swings in a transverse plane offset forwardly from the plane in which the arm 311 swings. This effective end of the arm 333 is in a position to be displaced by either one of two operating pins 335 and 337, each fixed to the shaft 93 and extending outwardly for a substantial distance from the shaft and then being bent to extend parallel to the axis of the shaft 93, through a sufficient distance to include the transverse plane in which the effective end of the operating arm 333 swings.

This switch 303, also of the three-wire or two-circuit type, is provided with wires 341, 342, and 343, the first two constituting one circuit, and the wires 341 and 343 constituting the second circuit. The first circuit 341, 342 is normally open and the second circuit 341, 343 is normally closed when the switch operating arm 333 lies close to the shaft 93. When the switch arm 333 is displaced outwardly away from the shaft 93 to a sufficient extent, either by the pin 335 or by the pin 337, then the first circuit 341, 342 is closed and simultaneously therewith the circuit 341, 343 is opened.

As already mentioned, in a switch of this type there is a slight difference in the position of the arm at which the switch is operated, when the switch arm swings in one direction, compared to the operating position when swinging in the other direction, this difference being, however, a relatively slight one, embracing a circular arc of usually around 5°. The parts are so proportioned in the present instance that the position in which the switch arm 311 is held by the main arcuate part of the cam 313, is approximately midway between the two positions which cause operation of the switch 301. When the shaft 93 turns counterclockwise so that the lip 317 on the cam plate displaces the switch arm 311 further away from the shaft, it reaches operating position, and the circuit 321, 322, if previously open, is closed, and the other circuit 321, 323, is opened. But when the shaft 93 turns reversely in a clockwise direction, and the switch arm 311 comes to rest on the arcuate part of the cam 313, the switch 301 will not be operated by this slight inward swinging of the switch arm 311, although it will be operated to open the circuit 321, 322 and close the circuit 321, 323 after further clockwise movement of the shaft 93 causes the trailing edge of the cam 313 to move beyond the position which is tangent to the switch arm 311 and allows the switch arm to swing in closer toward the shaft 93. Likewise, when the shaft 93 again turns counterclockwise, so that the arm 311 rides on the arcuate part of the cam 313, the displacement of the arm by the arcuate part of the cam will not operate the switch, but the switch will be operated when the lip 317 displaces the arm 311 still further outwardly from the shaft. This relationship of the parts is an important feature, for it permits easy and convenient control of various machinery or mechanism, such as a pump, in a manner much more satisfactory than has been possible with control switch mechanisms of the prior art.

The present invention includes a control system utilizing the gauge construction just described in connection with Figs. 6 and 7. Such a control system is illustrated diagrammatically in Fig. 8, reference to which is now made.

In this control system, let it be assumed that the present control gauge of Figs. 6 and 7 is mounted on a tank or container diagrammatically illustrated at 351, and that there is a pump 353 operated by an electric motor 355 for drawing liquid from a suitable source of supply, through an inlet pipe 357, and delivering it through an outlet pipe 359 leading to the tank 351. Let it further be assumed that it is desired automatically to start the pump in operation when the liquid level within the tank 351 reaches a predetermined low level, and to keep the pump in operation until the liquid in the tank reaches a predetermined high level, and then to stop the operation of the pump until the liquid in the tank 351 again reaches the predetermined low level at which operation of the pump should begin.

The motor 355 is driven from a suitable source of electric current indicated diagrammatically at 361, controlled by a relay switch 363. The electric circuits of the microswitches 301 and 303 are powered by another or secondary source of current 365, usually of lower voltage than the main current supply 361.

According to the present invention, the wire 321 from the switch 301 and the wire 341 from the switch 303 both lead to one side of the secondary current source 365. The wire 322 from the switch 301 leads to the opposite side of the current source 365 through the relay 363 and also through a pilot lamp 371 which is in parallel with the relay and which, when lit, indicates that the motor 355 and pump 353 are in operation. The wire 323 from the switch 301 leads to the opposite side of the current source 365 through a second pilot lamp 372 which, when lit, indicates that the motor 355 and pump 353 are not in operation. These pilot lights 371 and 372 may, of course, be placed at any desired remote point where they may be readily observed by an attendant.

The wire 343 from the other switch 303 leads to the opposite side of the current source 365 through a green pilot light 375 which, when lit, indicates that the liquid level in the tank 351 is normal, neither abnormally high nor abnormally low. The wire 342 from this switch 303 leads to the opposite side of the current source 365 both through a red pilot light 377 and an audible signal such as a buzzer or bell 379, which is connected in parallel with the pilot light 377. The operation of the pilot light 377 and the audible signal indicate that the liquid level in the tank 351 is either abnormally low or abnormally high, the same signal being given in either event.

Let it be assumed that the liquid level in the tank 351 is at a satisfactory elevation and that the pump and motor are not operating. Under these conditions, the position of the switch arm 311 of the switch 301 will be determined by the main arcuate part of the cam 313, so that this switch arm will lie in the full line position shown in Fig. 8. The circuit between the wires 321 and 322 will be open and the circuit between the wires 321 and 323 will be closed. Thus the pilot light 371 will be off, and the pilot light 372 will be lit, indicating that the motor is not in operation. Likewise, since the liquid level is at a satisfactory elevation, the switch arm 333 of the switch 303 will be at its position closest to the shaft 93 (that is, the full line position shown in Fig. 8, not displaced by either of the pins 335 or 337) and the circuit between the wires 341 and 342 will be open, while the circuit between the wires 341 and 343 will be closed, so that the green light 375 will be lit.

Now let it be assumed that the liquid level in the tank 351 falls to an unsatisfactory low level. As the float 61 descends when the liquid level falls, the magnet 45 will be correspondingly turned, and it will cause a corresponding turning of the magnet 95 and the shaft 93, in a counterclockwise direction when viewed from the front. This turning movement eventually will bring the lip 317 of the cam 313 into contact with the switch arm 311 at the time when the liquid level reaches an unsatisfactory condition, and will displace the switch arm 311 outwardly away from the shaft 93, from the full line position shown in Fig. 8 to the dotted line position indicated at a, which displacement is sufficient to operate the switch, closing the circuit between the wires 321 and 322, and opening the circuit between the wires 321 and 323. The pilot light 372 will now go out, the pilot light 371 will be lit, and simultaneously therewith the relay 363 will be operated to start the pump motor 355, commencing operation of the pump so that additional liquid is pumped into the tank 351 through the pipe 359.

If the drain or outflow from the tank 351 is greater than the capacity of the pump 353 to replenish the liquid in the tank, so that the liquid level drops still further below the point at which the pump operation is started, then the pin 337 on the shaft 93 will come around far enough to make contact with the arm 333 of the switch 303, and displace this arm outwardly from the full line position shown in Fig. 8 to the dotted line position indicated at c. The parts are so set that the switch arm 333 will not be operated simultaneously with the operation of the switch 301, but will be operated only if the liquid level drops a slight distance below the level at which the switch 301 is operated. If and when the switch 303 is operated by the pin 337, this will open the circuit between the wires 341 and 343, extinguishing the green pilot light 375, and will close the circuit between the wires 341 and 342, lighting the red pilot light 377 and sounding the audible alarm 379 so as to attract the attention of an attendant, who can then investigate the matter and see why the liquid level in the tank is still falling even though the pump 353 is supposed to be in operation. Remedial action can quickly be taken before any damage is done.

In normal operation the liquid level in the tank 351 will not sink any lower after the operation of the pump 353 is started, but will, on the contrary, rise. The rising of the float 51 will turn the magnet 45 in a clockwise direction, which will cause clockwise turning of the shaft 93. Early in the clockwise movement of the shaft 93, the extension or lip 317 on the cam 313 will move out of contact with the switch arm 311 and this will allow the switch arm to swing back from the dotted line position a to the full line position in Fig. 8, but this movement of the switch arm will not operate the switch, for the reasons above explained. Hence, as the liquid level continues to rise, the circuit between the wires 321 and 322 will remain closed, the motor 355 and pump 353 will remain in operation, and the pilot light 371 will remain lit, indicating to the attendant that the pump is in operation.

Finally, as the liquid level in the tank 351 rises, it will reach the point at which the operation of the pump should be stopped. At this time, the trailing edge of the cam 313 reaches the switch arm 311 and passes beyond the tangent position, so that the switch arm is allowed to swing inwardly toward the shaft 93, from the full line position of Fig. 8 to the dotted line position indicated at b. Although, as above stated, the swinging movement from the position a to the full line position is not sufficient to operate the switch 301, the swinging movement to the position b is of sufficient extent to operate the switch, and accordingly, at this time, the circuit between the wires 321 and 322 is opened and the circuit between the wires 321 and 323 closes. The opening of the former circuit extinguishes the pilot light 371, and, through the relay 363, stops the pump motor 355, while the closing of the other circuit lights the pilot light 372 to indicate to the attendant that the pump is not in operation. Normally, the arm 333 of the switch 303 is not affected and the green light 375 remains lit. However, if through a defect in the relay 363 or through any other reason, the liquid level in the tank 351 continues to rise beyond the level at which the pump should be shut off, then the pin 335 on the shaft 93 comes around far enough to make contact with the switch arm 333 and displace it from the full line position to the dotted line position c, which closes the circuit between the wires 341 and 342 and opens the circuit between the wires 341 and 343, extinguishing the green light 375 and lighting the red light 377 and sounding the audible signal 379, calling the attendant's attention to the fact that an abnormal condition exists. The operation of the signals 377 and 379 does not specifically tell the attendant whether the liquid level has risen too high or has fallen too low, since the same indication is given in either event, but it does call his attention to the fact that the parts are not functioning normally in the intended manner, so that investigation can be made. If it is desired to distinguish between the too-high alarm and a too-low alarm, it is within the scope of the present invention to do so by providing a third microswitch in the gauge casing, and having the high-level pin 335 operate the control arm of one microswitch and the low-level pin 337 operate the control arm of a different microswitch, although ordinarily it is not deemed necessary to do so.

Assuming that the pump motor has stopped at the proper time when the liquid level reaches the desired high point, then as liquid is withdrawn from the tank 351 and the level of the liquid therein is gradually lowered, the counterclockwise swinging of the shaft 93 will bring the cam 313 back to the place where the main surface of this cam will control the position of the switch arm 311, and the switch arm will thus resume the full line position in Fig. 8. However, the displacement of the arm outwardly from the dotted line position b to the full line position is not sufficient to operate the switch, and the switch will not be operated to start the motor until the switch arm is moved still farther outwardly to the dotted line position a, by the lip or projection 317 on the cam, as previously mentioned.

This mechanism above described in connection with Fig. 8 is extremely simple, satisfactory, and efficient, giving reliable indications of the necessary conditions to the attendant in charge of the installation. The utilization, in a control system as in Fig. 8, of the control gauge illustrated in Figs. 6 and 7, has the great advantage as compared to prior control switches for similar purposes that this control gauge can be substituted for the alarm gauge of Figs. 1 and 2, or for a non-alarm gauge, on the same base plate or mounting plate 21, without requiring any new opening or without uncovering any existing opening in the tank to which the unit is applied. Thus the base plate or mounting plate 21 may be applied to the wall of a given tank or container when such tank leaves the factory, and it may be left for future determination whether an ordinary liquid level gauge with no electric switches, or an alarm gauge of the type shown in Figs. 1 and 2, or a control gauge of the type shown in Figs. 6 and 7, is to be installed on the base plate or mounting plate 21 when the tank reaches its destination and is installed. Or, if one of these three types of gauges is initially installed on the mounting plate 21, it may be replaced at any future date by either of the other two types, in a very simple and easy manner, without draining or otherwise affecting the contents of the tank to which the gauge is applied.

It will be readily understood, of course, that the control switch mechanism shown in Figs. 6 and 7 can be applied equally well to the type of gauge casing shown in Fig. 4, or to the type of gauge casing shown in Fig. 5. The control mechanism of Figs. 6 and 7 has been illustrated in connection with the same form of gauge casing shown in Figs. 1 and 2, only for the sake of a convenient example, and not as a limitation.

It is seen from the foregoing disclosure that the above mentioned objects of the invention are admirably fulfilled. It is to be understood that the foregoing disclosure is given by way of illustrative example only, rather than by way of limitation, and that without departing from the invention, the details may be varied within the scope of the appended claims.

Many of the features of construction herein described are not limited in their usefulness to a liquid level gauge, but may be advantageously employed also in connection with other indicating instruments, such as, for example, thermometers and fluid pressure gauges. Certain subject matter disclosed herein is disclosed and claimed also in my copending United States patent application entitled Alarm Thermometer, Serial No. 2,575, filed January 16, 1948.

What is claimed is:

1. A gauge of the magnetic drive type including a mounting plate for attachment to a container and a driving magnet mounted on the rear of said plate, a casing removably mounted on the front of said plate, a dial plate mounted in said casing, a shaft rotatably mounted in said casing, a driven magnet fixed to said shaft in position to cause rotation of said shaft as a result of rotation of said driving magnet, and a pointer mounted on said shaft in position to sweep over said dial plate when said shaft is rotated, characterized by a microswitch mounted within said casing, said microswitch having an operating arm mounted for oscillation on a pivotal axis substantially parallel to the axis of rotation of said shaft and extending to the vicinity of said shaft, an operating member fixed to said shaft and effective upon rotation of said shaft to a predetermined position to cause operation of said arm to operate said microswitch, and electric circuit connections leading from said microswitch to a point external of said casing so that the operation of said microswitch may operate an electric signal at a remote point.

2. A construction as described in claim 1, further characterized in that the space in said casing containing said shaft, driven magnet, and microswitch is sealed from access of external moisture and dust by a liquid-tight back plate in said casing independent of said mounting plate.

3. A construction as described in claim 1, furthur characterized in that said mounting plate includes a relatively thick peripheral edge, and said casing includes a flange portion overlapping and embracing said peripheral edge of said mounting plate and being supported thereby.

4. A construction as described in claim 3, further characterized in that said electric circuit connections are supported independently of said mounting plate, so that said casing may be readily removed from said mounting plate and replaced by another gauge casing shaped to fit the peripheral edge of the same mounting plate.

5. An alarm gauge of the magnetic drive type including a mounting plate adapted to be mounted on a container and a driving magnet mounted on the rear of said plate, a gauge casing removably mounted on the front of said plate, a pointer shaft rotatable in said casing, a dial plate mounted in said casing, a pointer fixed to said shaft to sweep over said dial plate when said shaft is rotated, and a driven magnet fixed to said pointer shaft to rotate said shaft under the influence of said driving magnet, characterized by an electric switch mounted in said casing, a switch operating arm mounted for oscillation on a pivotal axis substantially parallel to the axis of rotation of said shaft and extending from said switch to the proximity of said pointer shaft, an element fixed to said pointer shaft in position to contact with and operate said switch arm as the pointer shaft is turned, and electric circuit connections extending from said electric switch to a point external of said casing so that said switch may operate a signal at a remote point.

6. A construction as described in claim 5, further characterized in that said casing is provided in a side wall with an opening through which said electric circuit connections extend.

7. A construction as defined in claim 6, further characterized in that said electric circuit connections include flexible wires extending out through said opening, and said casing contains a guard plate forming a partial partition between said opening and said pointer shaft, to protect said pointer shaft and other moving parts of the gauge from contact by said wires when said wires are moved from the exterior of said casing.

8. A construction as defined in claim 7, further characterized in that said guard plate carries a stop member lying in the path of movement of said driven magnet to limit the extent of rotation of said driven magnet.

9. An indicating instrument of the type including a casing having side walls and a transverse wall adjacent the rear thereof, a transparent plate extending across the casing adjacent the front thereof, and a rotary member within said casing for rotation in accordance with variations in the factor to be indicated by said instrument, characterized by a dial plate mounted forwardly of said transverse wall and rearwardly of said transparent plate, means supporting said dial plate from said transverse wall in spaced relation thereto and independently of and spaced from the side walls of said casing, an electric switch mounted between said transverse wall and said dial plate, and means for operating said electric switch from the rotation of said rotary member.

10. An indicating instrument of the type including a mounting plate, a bezel removably mounted on said mounting plate and extending forwardly from approximately the periphery thereof, and a transparent plate extending across said bezel approximately at the front thereof, characterized by said bezel being provided near its front edge with an internal seat having an approximately cylindrical portion and a rearwardly faced portion at the front end of said cylindrical portion, said transparent plate being seated in said seat, a metal ring tightly pressed into and thereby firmly retained in said cylindrical portion of said seat, and having an inwardly extending annular flange overlapping the marginal edge of said transparent plate on the rear side thereof to hold said transparent plate in said seat and having another flange of approximately cylindrical form extending rearwardly from said annular flange, a rearwardly faced annular seat on said bezel spaced substantially rearwardly from said transparent plate, a transverse sealing partition member extending across said bezel and having its marginal edges seated on said annular seat of said bezel, a dial plate spaced forwardly of said transverse member, and a plurality of posts mounted on and projecting forwardly from said transverse member and connected to said dial plate to support said dial plate from said transverse member.

11. A construction as defined in claim 10, further characterized in that said dial plate lies in a plane substantially at the rear edge of said rearwardly extending flange of said metal ring, and the marginal edges of said dial plate are closely adjacent to said flange of said metal ring.

12. A magnetic drive gauge of the type including a plate, a driving magnet mounted on one side of said plate, a casing, a shaft mounted in said casing on the opposite side of said plate from said driving magnet, a driven magnet fixed to said shaft in position to be under the magnetic influence of said driving magnet to turn therewith, a dial plate, and a pointer secured to said shaft to sweep across the face of said dial plate as said shaft is turned, characterized by an electric switch mounted in said casing behind said dial plate, an operating arm extending from said switch into proximity to said shaft, an element mounted on said shaft for cooperation with said arm to operate said switch when said shaft reaches a predeterined point in its rotation and a stationary member lying in the path of travel of said driven magnet to limit rotation of said driven magnet to a range in which said element on said shaft will not move beyond a desired position relative to said operating arm of said switch.

13. A gauge of the magnetic drive type including a mounting plate for attachment to a container and a driving magnet mounted on the rear of said plate, a casing removably mounted on the front of said plate, a shaft rotatably mounted in said casing, and a driven magnet fixed to said shaft in position to cause rotation of said shaft as a result of rotation of said driving magnet, characterized by a microswitch mounted within said casing, said microswitch having an operating arm mounted for oscillation about an axis substantially parallel to the axis of rotation of said shaft and extending to the vicinity of said shaft and mounted for swinging movement in a direction transverse to said shaft through a plurality of positions including one position at which said switch is operated when said arm swings in a direction away from said shaft and a different position at which said switch is operated when said arm swings in a direction toward said shaft, an operating member fixed to said shaft to rotate therewith and effective at one point in the rotation of said shaft to cause said arm to assume one of its said switch operating positions and effective at another substantially different point in the rotation of said shaft to cause said arm to assume the other of its said switch operating positions and effective during the rotation of said shaft between said two points to hold said arm intermediate its said two positions, and electric circuit connections leading from said microswitch to a point external of said casing so that the operation of said microswitch may control electric apparatus at a remote point.

14. A gauge of the magnetic drive type including a mounting plate for attachment to a container and a driving magnet mounted on the rear of said plate, a casing removably mounted on the front of said plate, a shaft rotatably mounted in said casing, and a driven magnet fixed to said shaft in position to cause rotation of said shaft as a result of rotation of said driving magnet, characterized by a first microswitch and a second microswitch both mounted within said casing, said first microswitch having an operating arm extending to the vicinity of said shaft and mounted to swing in a plane transverse to said shaft about an axis of oscillation substantially parallel to the axis of rotation of said shaft, said second microswitch having an operating arm also extending to the vicinity of said shaft and mounted to swing in another plane transverse to said shaft and axially offset with respect to the plane of said arm of said first microswitch, about an axis of oscillation substantially parallel to the axis of rotation of said shaft, and a plurality of separate operating members fixed to said shaft, one of said members being effective upon rotation of said shaft to predetermined positions to cause operation of said arm of said first microswitch, another of said members being effective to operate said arm of said second microswitch at one position in the rotation of said shaft, and a third one of said members being effective to operate said arm of said second microswitch at a different position of operation of said shaft.

15. A gauge of the magnetic drive type including a mounting plate for attachment to a container and a driving magnet mounted on the rear of said plate, a casing removably mounted on the front of said plate, a shaft rotatably mounted in said casing, and a driven magnet fixed to said shaft in position to cause rotation of said shaft as a result of rotation of said driving magnet, characterized by a microswitch mounted within said casing, said microswitch having an operating arm extending to the vicinity of said shaft and biased for swinging movement in a direction toward said shaft in a plane transverse to said shaft, said swinging movement of said arm being effective to close said switch at one point in the swinging movement of said arm away from said shaft and to open said switch at a different point closer to said shaft as said arm swings in a direction toward said shaft, and an operating member on said shaft effective when said shaft is turned to one position to displace said arm far enough away from said shaft to close said switch, and effective when said shaft is turned to a substantially different position to allow said arm to swing close enough to said shaft to open said switch, and effective in intermediate positions to hold said arm intermediate its switch closing and switch opening positions during a substantial range of rotation of said shaft.

16. A gauge of the magnetic drive type including a mounting plate for attachment to a container and a driving magnet mounted on the rear of said plate, a casing removably mounted on the front of said plate, a shaft rotatably mounted in said casing, and a driven magnet fixed to said shaft in position to cause rotation of said shaft as a result of rotation of said driving magnet, characterized by a first microswitch mounted within said casing, said microswitch having an operating arm extending to the vicinity of said shaft and biased for swinging movement in a direction toward said shaft in a plane transverse to said shaft, said swinging movement of said arm being effective to close said switch at one point in the swinging movement of said arm away from said shaft and to open said switch at a different point closer to said shaft as said arm swings to a direction toward said shaft, an operating member on said shaft effective when said shaft is turned to one position to displace said arm far enough away from said shaft to close said switch, and effective when said shaft is turned to a substantially different position to allow said arm to swing close enough to said shaft to open said switch, and effective in intermediate positions to hold said arm intermediate its switch closing and switch opening positions during a substantial range of rotation of said shaft, a second microswitch also mounted within said casing and likewise having an operating arm extending to the vicinity of said shaft for swinging movement in a plane transverse to said shaft, a second operating member mounted on said shaft and effective when said shaft is turned to one position to engage said arm of said second microswitch and displace it to operate said second microswitch, and a third operating member mounted on said shaft and effective when said shaft is rotated to a substantially different position to engage said arm of said second microswitch and displace it sufficiently to operate said second microswitch.

GEORGE E. FORD.

REFERENCES CITED

The following references are of record in the file of this patent:

UNITED STATES PATENTS

| Number | Name | Date |
|---|---|---|
| 1,202,854 | Knight | Oct. 13, 1916 |
| 1,572,807 | Price | Feb. 9, 1926 |
| 1,694,658 | Johnson | Dec. 11, 1928 |
| 2,028,263 | Warrick | Jan. 21, 1936 |
| 2,127,422 | Phaneuf | Aug. 16, 1938 |
| 2,215,570 | Sylvander | Sept. 24, 1940 |
| 2,217,609 | Bierman | Oct. 8, 1940 |
| 2,300,895 | Hopkins | Nov. 3, 1942 |
| 2,340,902 | Scully et al. | Feb. 8, 1944 |
| 2,352,830 | Ford | July 4, 1944 |
| 2,356,652 | Connolly et al. | Aug. 22, 1944 |
| 2,366,668 | Heim | Jan. 2, 1945 |
| 2,379,861 | Browne et al. | July 10, 1945 |
| 2,384,928 | Kahn | Sept. 18, 1945 |
| 2,532,383 | White | Dec. 5, 1950 |

FOREIGN PATENTS

| Number | Country | Date |
|---|---|---|
| 167,457 | Great Britain | Aug. 31, 1922 |